US007434876B2

(12) United States Patent
Smulders et al.

(10) Patent No.: US 7,434,876 B2
(45) Date of Patent: Oct. 14, 2008

(54) REMOVABLE CAR SEAT COVER

(76) Inventors: Mary-Lou Laetitia Smulders, 107 Alameda Ave., Half Moon Bay, CA (US) 94019; Catherine Marsh Chase, 100 Valencia St., Half Moon Bay, CA (US) 94019

( * ) Notice: Subject to any disclaimer, the term of this patent is extended or adjusted under 35 U.S.C. 154(b) by 44 days.

(21) Appl. No.: 11/222,431

(22) Filed: Sep. 8, 2005

(65) Prior Publication Data

US 2007/0052277 A1    Mar. 8, 2007

(51) Int. Cl.
*B60N 2/28* (2006.01)
(52) U.S. Cl. .................................... 297/219.12
(58) Field of Classification Search ............. 297/250.1, 297/219.12, 484
See application file for complete search history.

(56) References Cited

U.S. PATENT DOCUMENTS

| 4,478,453 | A | 10/1984 | Schutz ...................... 297/219 |
| 4,883,701 | A | 11/1989 | Rankin et al. ............... 428/136 |
| 4,891,454 | A | 1/1990 | Perdelwitz, Jr. et al. ..... 428/137 |
| 5,228,745 | A | 7/1993 | Hazel ........................ 297/229 |
| 5,449,223 | A * | 9/1995 | Miculici et al. ............. 297/484 |
| 5,829,829 | A * | 11/1998 | Celestina-Krevh ..... 297/219.12 |
| 6,036,263 | A * | 3/2000 | Gold ...................... 297/219.12 |
| 6,428,098 | B1 | 8/2002 | Allbaugh ............... 297/219.12 |
| 6,764,134 | B1 | 7/2004 | Crescenzi et al. ...... 297/219.12 |
| 7,192,086 | B2 * | 3/2007 | Davis et al. ............ 297/219.12 |
| 2004/0207239 | A1 | 10/2004 | King ..................... 297/219.12 |
| 2004/0239163 | A1 | 12/2004 | Runk .................... 297/219.12 |
| 2005/0110315 | A1 | 5/2005 | Littlehorn et al. ...... 297/219.12 |

FOREIGN PATENT DOCUMENTS

WO    WO 2004094183    11/2004

* cited by examiner

*Primary Examiner*—Peter R. Brown

(57) ABSTRACT

A removable car seat cover has openings adapted to allow the crotch strap and shoulder straps to extend through the cover while the straps remain affixed to the car seat. The removable cover comprises a periphery that secures the cover to the edges of a car seat. Various configurations of openings for shoulder straps to extend through include: two vertical openings, a "U"-shaped opening, multiple horizontal openings connected by a vertical slit and openings for shoulder belts used with booster seats. Fasteners and panels can be added to each configuration to provide further protection to the underlying factor car seat cover. A matching canopy cover has extended panels to provide additional protection from rain or the sun.

10 Claims, 10 Drawing Sheets

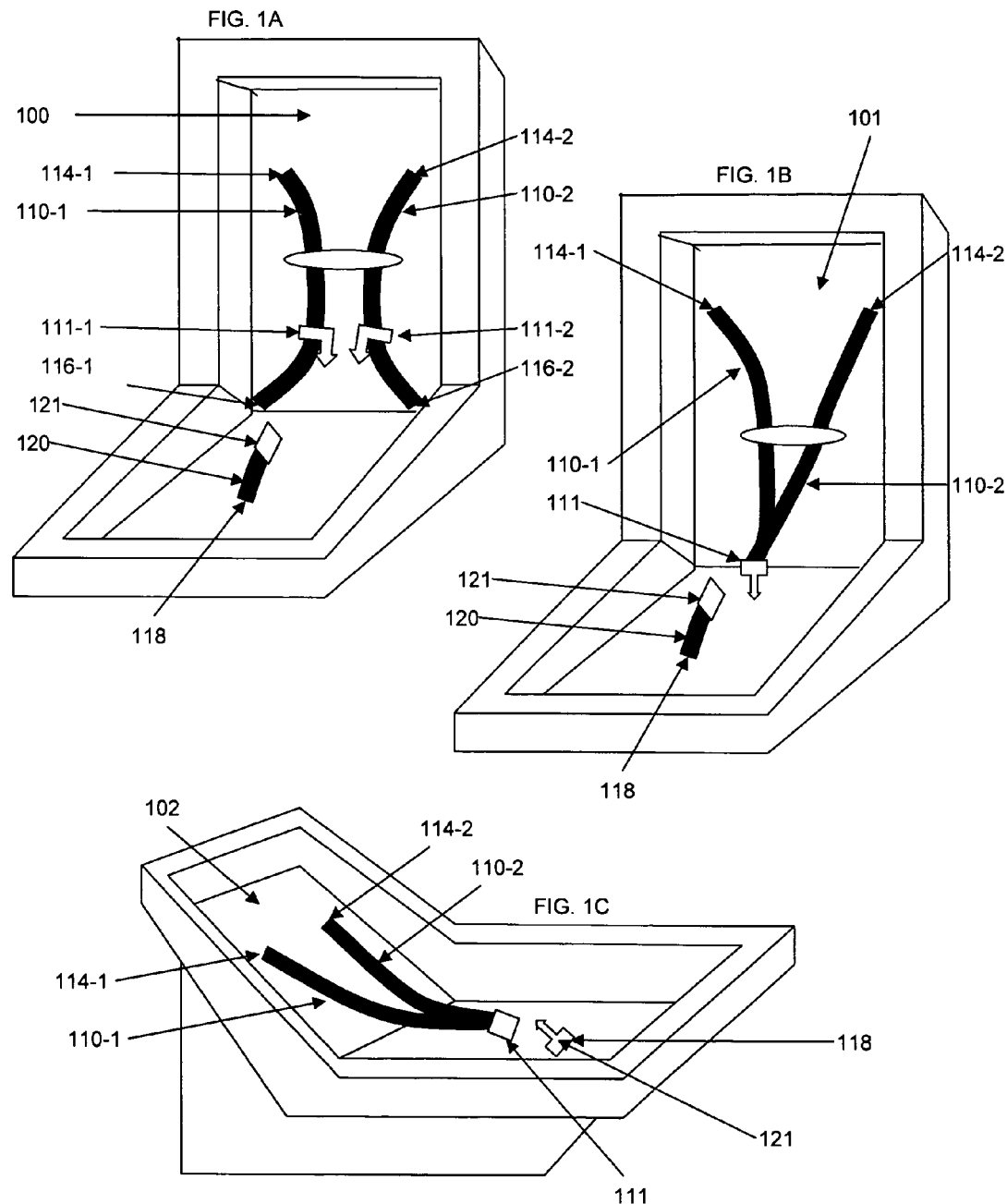

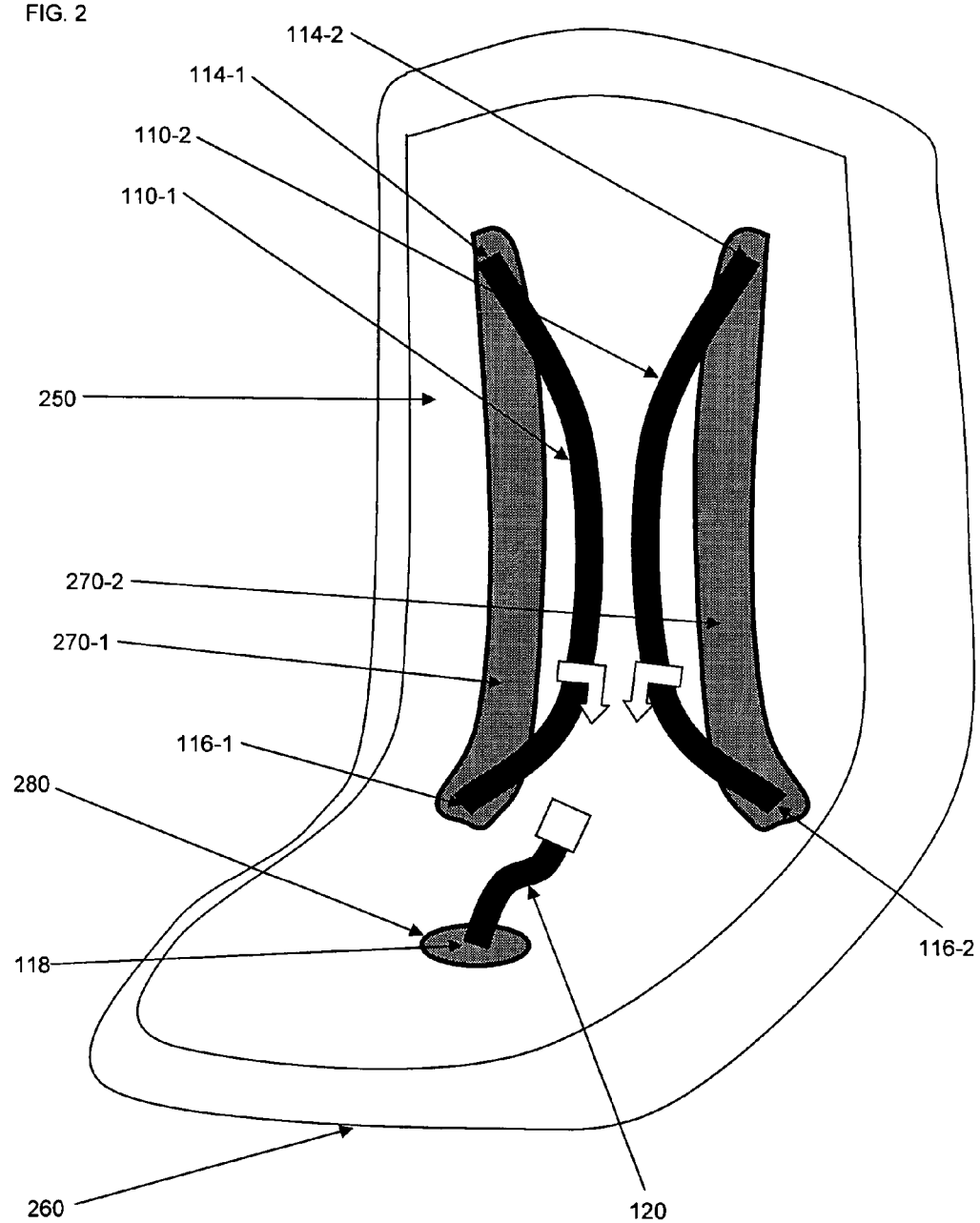

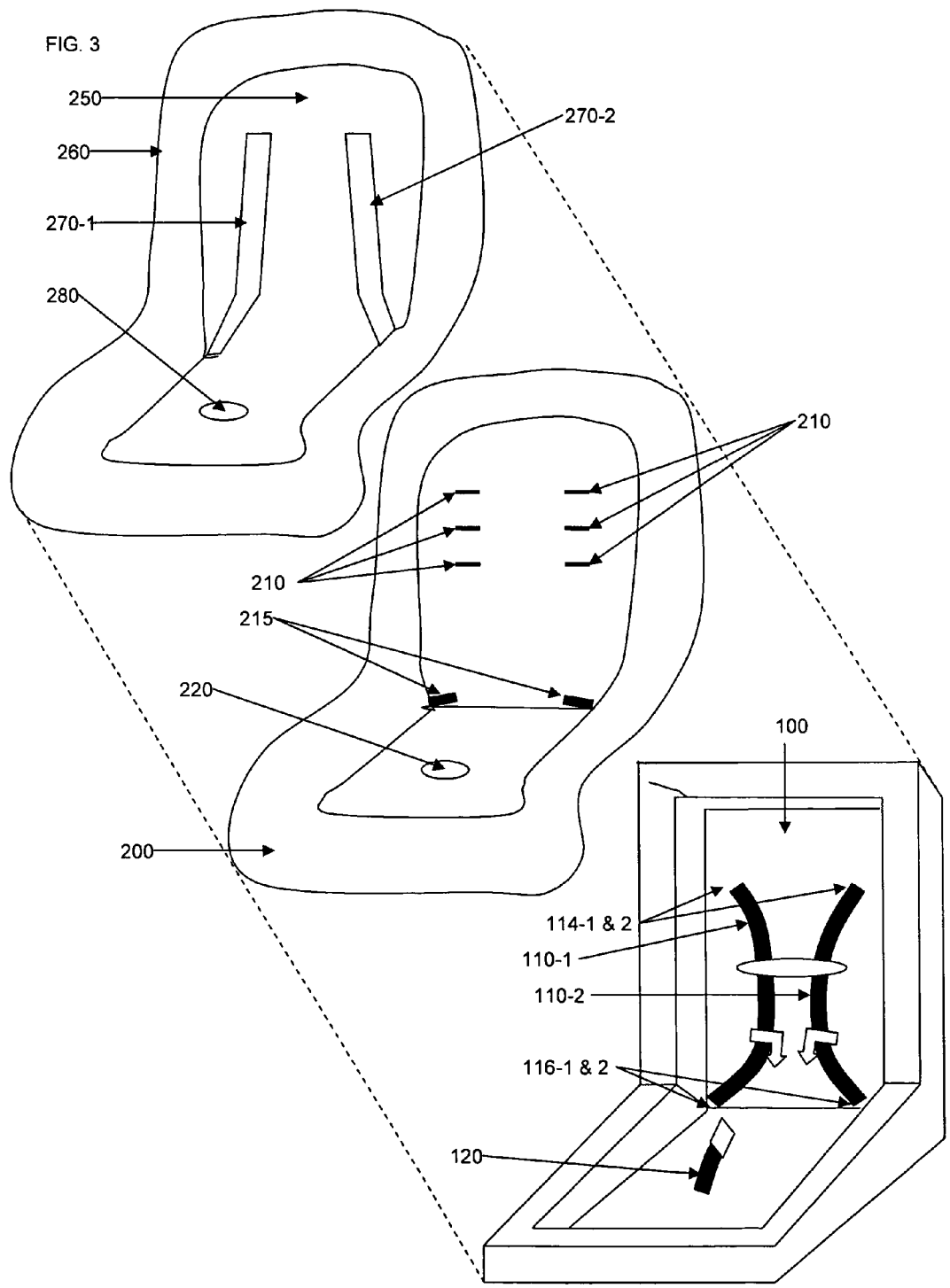

REMOVABLE CAR SEAT COVER

FIELD OF THE INVENTION

The invention relates to automotive safety seats for children in general, and in particular to a detachable supplemental cover for a child's car seat.

BACKGROUND OF THE INVENTION

Children sit in a car seat with a restraint system while traveling by automobile. Some car seats can be removed from the car for use as a carrier or for placement on a stroller. Child car seats are generally made with a molded plastic shell covered with a padded seat cover. Harness straps and hardware for securing the child extend through openings in the padded cover and are anchored to the plastic shell. The safety harness comes in either a 3-point, 5-point and 6-point configuration. The 3-point harness has a strap over each shoulder which come together and attach at the crotch. In the five-point harness, a lap belt integrates with or attaches to the shoulder straps, which then attach at the crotch. A six-point harness is configured much like a 5-point harness, but has two connection points at the crotch. Car seat covers generally have multiple openings for threading straps through the cover, allowing adjustments for different sized children. Usually, the upper anchor points for the shoulder straps allow for adjustments to the strap lengths.

Car seats come in multiple sizes and configurations. Generally, car seats are rear-facing for infants and forward facing for toddlers. Convertible seats work both ways, changing from rear facing to forward facing as the child grows. Many infant car seats have a fabric canopy attached to the car seat. The canopy extends over a portion of the car seat to shade children from the sun. Booster seats are similar to toddler seats, but integrate with a car's seatbelt rather than using an integrated harness. Clips or openings position a shoulder belt in the proper location to restrain the child.

Children soil their car seat covers easily. As a result, manufacturers of car seats generally make a removable padded cover that can be laundered. Caregivers, however, find removing car seat covers for laundering difficult. To remove a seat cover, the seat must be removed from the car, the straps must be unthreaded from the openings in the seat cover, and removing chest and crotch buckles from the straps. Replacing the cover requires rethreading the straps through the seat cover openings, properly orienting and rethreading all the buckles, then finally reinstalling the car seat into the car.

U.S. Pat. Nos. 4,883,701 and 4,891,454 disclose disposable or reusable liners with slits and perforations allowing the liner to fit into many different car seat shapes. Depending on the car seat configuration, the shoulder straps may still have to be threaded through openings in the liner. The disposable liners disclosed in U.S. Pat. Nos. 4,883,701 and 4,891,454 do not fully cover and protect the factory cover, but rather protect just the seating portion of the padded cover. A need exists for an attractive, easily replaceable car seat cover that does not require removing or rethreading the shoulder straps or removing the seat from the car or stroller.

SUMMARY OF THE INVENTION

The removable car seat cover that meets the need identified above installs over the car seat and existing padded upholstery. The removable cover comprises a periphery that secures the cover to the edges of a car seat. Openings in the cover allow shoulder straps and one or two crotch straps to extend through the cover while the ends of the straps remain affixed to the car seat.

One embodiment of the cover has two vertical openings allowing shoulder straps of a five-point or six-point harness system to extend through the cover. Optionally, a second panel of cover material can be affixed to the cover such that it covers the openings between the points where the top and bottom portions of the shoulder straps extend through the cover.

Another embodiment of the cover has a "U" shaped opening allowing shoulder straps of a three-, five- or six-point harness system to extend through the cover. A fastener, such as Velcro, can hold the fabric on each side of the "U" shaped opening together. Optionally, a flat panel attaches behind the upper portion of the "U" shaped opening. The top of the flat panel attaches to the back of the cover above the top end of the "U" shaped opening. The bottom of the flat panel attaches to the portion of the cover between the slits defined by the "U" shaped opening. The left and right side of the flat panel each have one or more elasticized horizontal slits, which close around the shoulder straps passing through the panel. The outer ends of the horizontal slits fasten together with a snap or other fastener.

Another embodiment of the seat cover uses two or more horizontal openings that extend across the back of the seat cover, wherein the horizontal patches of cover material between the openings come apart vertically, the two sides held by a fastener. The shoulder straps of a three-point harness system will extend through an upper horizontal opening. By opening the fasteners holding the two sides, shoulder straps in a five- or six-point harness system extend through an upper and lower horizontal opening. Refastening the two sides keep the back of the seat cover flat.

For car seats with a canopy, the car seat cover includes a matching canopy cover. The canopy cover has an additional panel that hangs over the front or back edge of the canopy for shading the infant.

Another embodiment of the seat cover has openings for the shoulder belt positioning mechanism on a booster seat.

BRIEF DESCRIPTION OF DRAWINGS

The novel features believed characteristic of the invention are set forth in the appended claims. The invention itself, however, as well as a preferred mode of use, further objectives and advantages thereof, will be understood best by references to the following detailed description of an illustrative embodiment when read in conjunction with the accompanying drawings, wherein:

FIG. 1A is a toddler car seat with a five-point harness.

FIG. 1B is a toddler car seat with a three-point harness.

FIG. 1C is an infant car seat with a three-point harness.

FIG. 2 is a front view of a removable car seat cover with two vertical openings for shoulder straps being used on a toddler seat with a five-point harness.

FIG. 3 is an exploded view of a removable car seat cover being used on a toddler seat with a five-point harness.

DETAILED DESCRIPTION OF THE PREFERRED EMBODIMENT

Figure 1D:
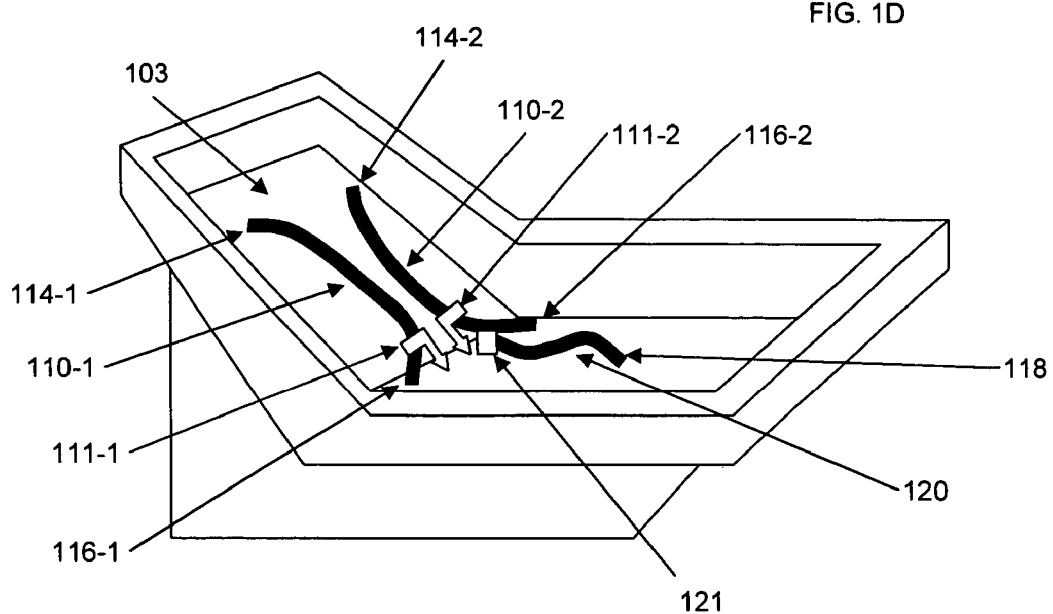
FIG. 1D is an infant car seat with a five-point harness.
Figure 1E:
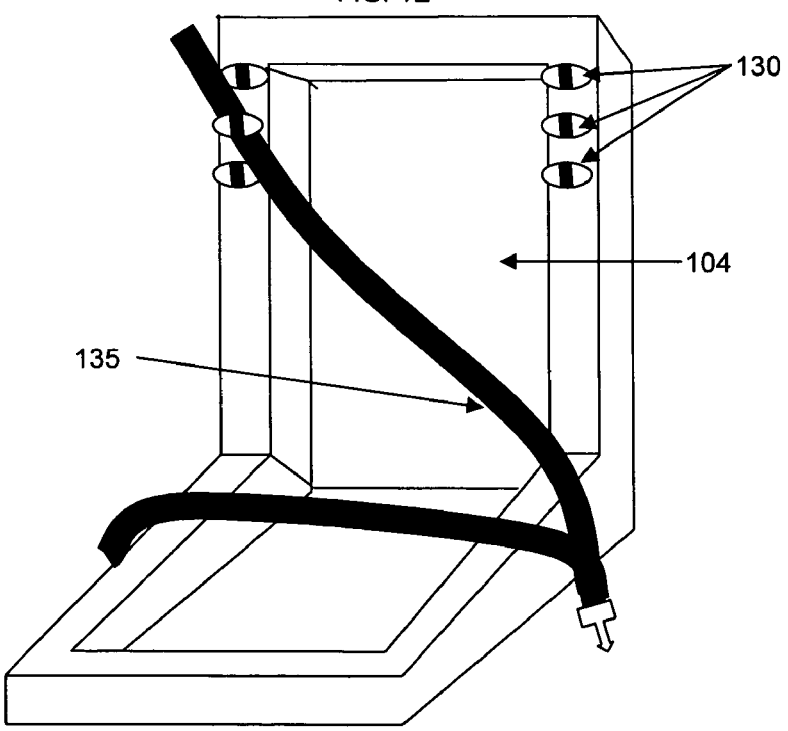
FIG. 1E is a booster seat with shoulder belt positioning clips.

Common car seat configurations are shown in FIGS. 1A, 1B, 1C, 1D and 1E. FIG. 1A shows toddler seat 100 with a 5-point harness. Shoulder straps 110-1 and 110-2 attach at upper anchor points 114-1 and 114-2 above the child's shoulders and at lower anchor points 116-1 and 116-2 near the child's hips. Crotch strap 120 with buckle 121 attaches at anchor point 118 between the child's legs. Buckles 111-1 and 111-2 on the shoulder straps connect to buckle 121 on crotch strap 118 to secure the child. Some car seats use a six-point harness, which is configured like a five-point harness, but with a second strap and buckle at the crotch. FIG. 1B shows toddler seat 101 with a 3-point harness. Often, a single belt of material forms both shoulder straps 110-1 and 110-2. One end of strap 110-1 attaches to anchor point 114-1 above one shoulder. Strap 110-1 extends down towards the crotch, threads though buckle 111, and (now as strap 110-2) extends up and attaches to anchor point 114-2 by the other shoulder. Buckle 121 attaches to crotch strap 120. Crotch strap 120 attaches to the seat at anchor point 118. Buckle 111 attaches to buckle 121 to secure the child. FIG. 1C shows infant seat 102 with a 3-point harness. Shoulder straps 110-1 and 110-2 attach at upper anchor points 114-1 and 114-2 above the child's shoulders and come together, attaching at buckle 111. In this embodiment, crotch buckle 121 attaches directly to anchor point 118 without a crotch strap. Buckle 111 attaches to buckle 121 to secure the child. FIG. 1D shows infant seat 103 with a 5-point harness. Shoulder straps 110-1 and 110-2 attach at upper anchor points 114-1 and 114-2 above the child's shoulders and at lower anchor points 116-1 and 116-2 near the child's hips. Crotch strap 120 with buckle 121 attaches at anchor point 118 between the child's legs. Buckles 111-1 and 111-2 on the shoulder straps connect to buckle 121 on crotch strap 120 to secure the child. Car seats with a 6-point harness have a second crotch strap and crotch buckle attached at anchor point 118. FIG. 1E shows booster seat 104 with shoulder belt positioning clips 130. Shoulder belt 135 passes through shoulder belt positioning clips, allowing an automobile seat belt to properly restrain children. Some booster seats use slots or other openings rather than clips to position the shoulder belt.

FIG. 2 shows a removable car seat cover 250 for use with 5-point or 6-point harnesses. Although FIG. 2 shows a toddler seat cover, one skilled in the art will readily understand how to adapt the invention to an infant seat. The cover is comprised of a washable fabric, and may have a plurality of layers. Removable seat cover fabrics may comprise absorbent or stain resistant materials, with consideration made for ease of cleaning and comfort of the child. Water proof linings or absorbent materials may also be used to protect the underlying factory cover. The periphery 260 of removable cover 250 comprises an elastic material that secures the removable seat cover to the seat. Periphery 260 may comprise, for example, a rubber material sewn into the edge of the seat cover or making a border area of a stretchy material such as Lycra (™). Two vertical openings 270-1 and 270-2 extend from near the top of cover 250 to the point where the seat back connects to the bottom of the seat. The top of the openings begin above upper anchor point 114-1 and 114-2 on shoulder straps 111-1 and 111-2. Openings 270-1 and 270-2 extend to lower anchor points 116-1 and 116-2, near the child's hips. Openings 270-1 and 270-2 may slightly arc laterally towards the outside to accommodate lower anchor points 116-1 and 116-2. Crotch opening 280 is located over anchor point 118 for crotch strap 120. Crotch opening 280 may be rectangular or oblong to accommodate various placements of crotch strap 120 by different manufactures.

FIG. 3 shows an exploded view of car seat cover 250 used with toddler seat 100 and factory padded cover 200. Shoulder straps 110-1 and 110-2 pass through openings 210 and 215 in factory seat cover 200 at upper anchor points 114-1 and 114-2 and lower anchor points 116-1 and 116-2. The shoulder straps must be threaded though openings 210 and 215 in factory seat cover 200. Crotch strap 120 passes though opening 220 at the base of factory seat cover 200. Elasticized periphery 260 secures removable seat cover 250 to car seat 100, enveloping factory cover 200. Shoulder straps 110-1 and 110-2 extend through long vertical slots 270-1 and 270-2 cut into removable cover 250 while remaining affixed to car seat 100. Crotch strap 120 extends through opening 280 at the crotch of removable cover 250. Other alternatives, not shown here, add a panel of fabric to cover the portion of vertical openings between the upper and lower anchor points of the shoulder straps. The panel should be wide enough to cover both vertical openings. The panel can extend above the top of the vertical openings, and have a narrow slit cut into each side to allow shoulder straps to pass through. The slots can be elasticized to enhance protection to the underlying factory cover, and the ends of the slits can be closed with a snap or other fastener. The panel attaches to either the front or back of the cover with fasteners such as Velcro or snaps, and may fixedly attach to one side of the cover like a flap.

Figure 4:
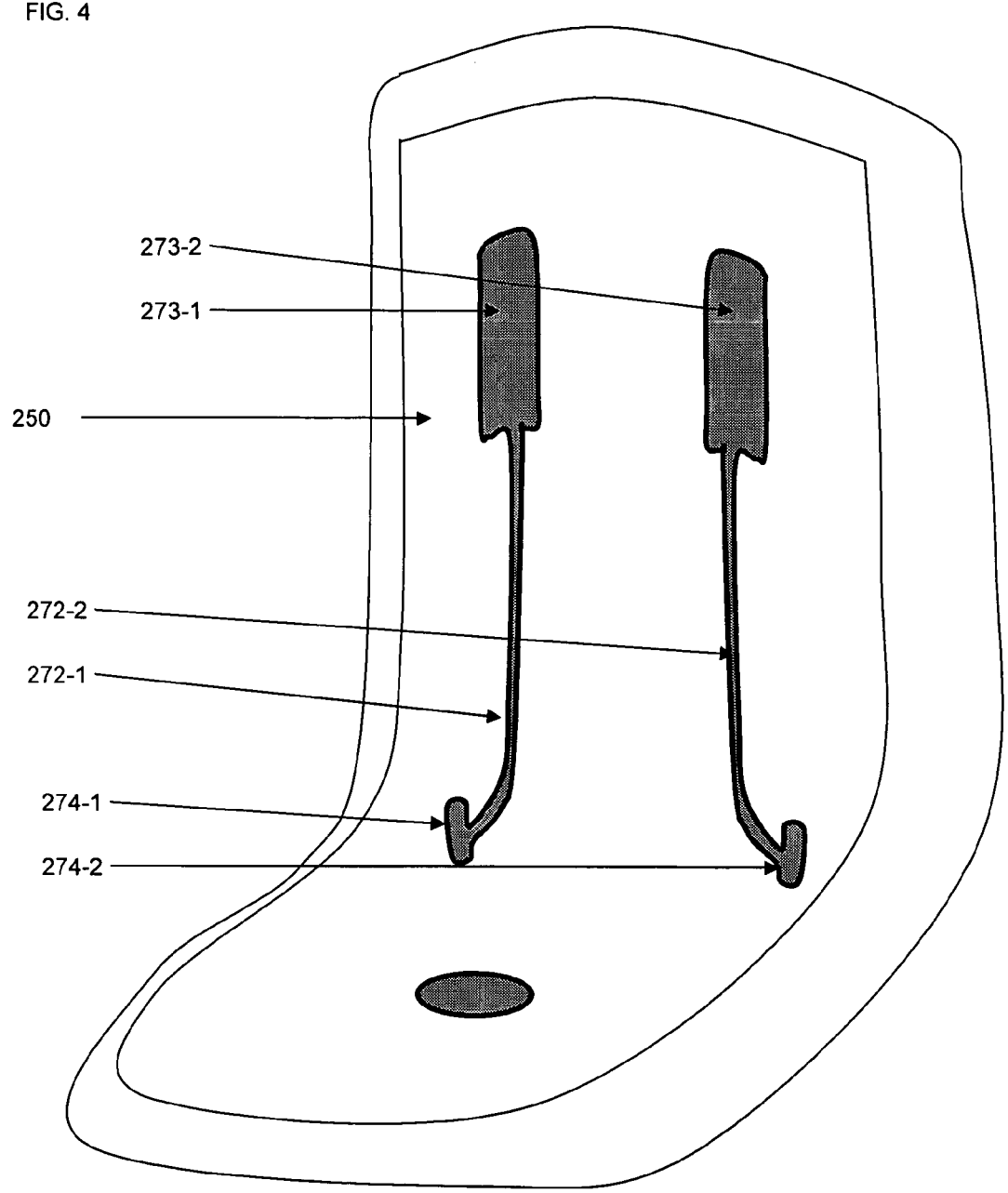
FIG. 4 is a front view of an alternate embodiment of a removable car seat cover with two vertical openings for shoulder straps.

FIG. 4 shows an alternate embodiment of vertical openings 272-1 and 272-2 in seat cover 250. Openings 272-1 and 272-2 have a long wider portion 273-1 and 273-2 at the top and a short wider portion 274-1 and 274-2 at the bottom to allow for the shoulder straps 110-1 and 110-2 (not shown) to pass through. Upper wide portions 273-1 and 273-2 are long enough to accommodate all upper shoulder strap anchor points 114-1 and 114-2. Lower wide portions 274-1 and 274-2 are poisoned at the hip to accommodate the lower shoulder strap anchor points 116-1 and 116-2. The narrow portion of vertical openings 272-1 and 272-2 may be left open, or alternatively, may be held together by a fastener such as Velcro or snaps.

Figure 5:
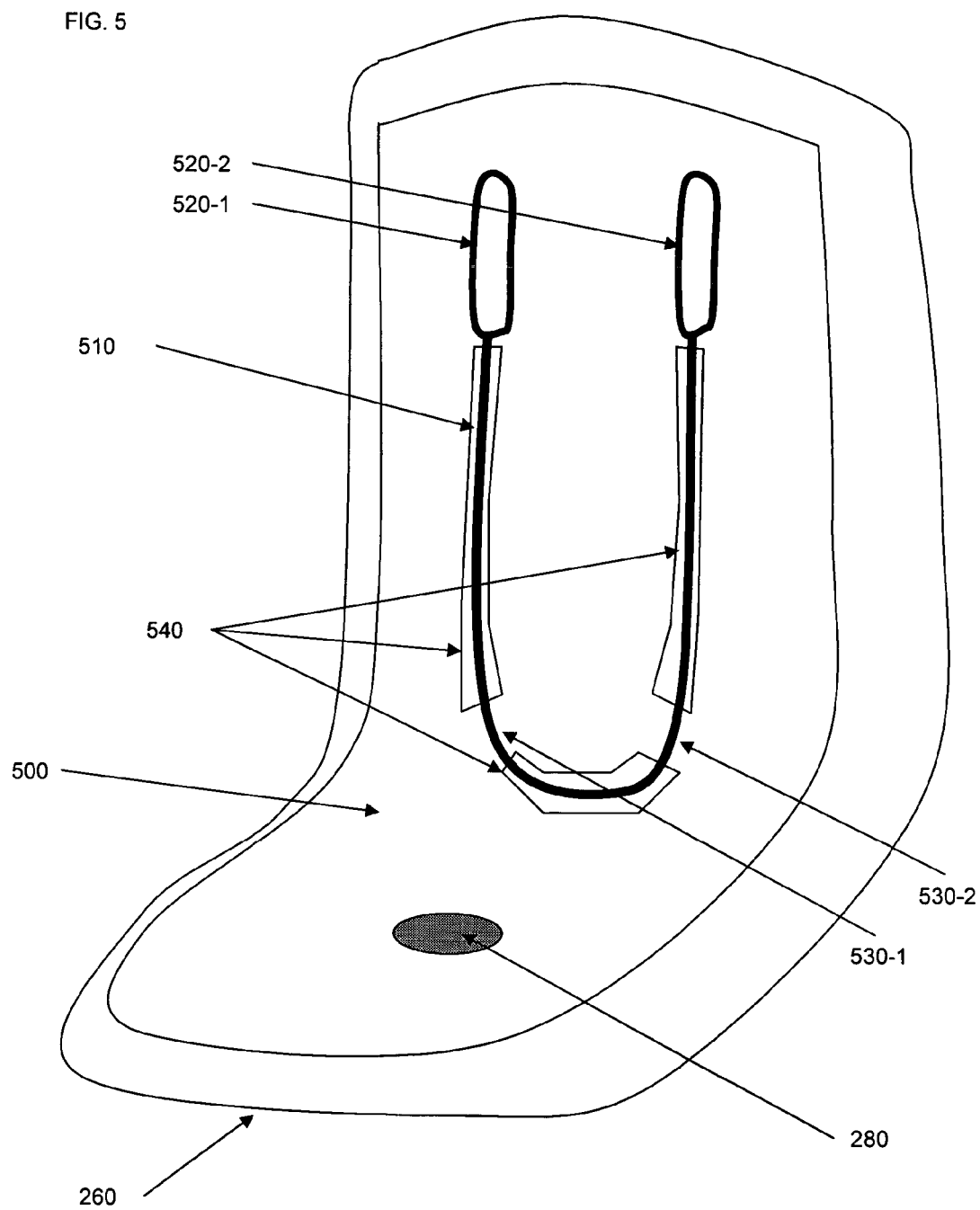
FIG. 5 is a front view of a removable car seat cover with a "U"-shaped opening for shoulder straps.

FIG. 5 shows removable car seat cover 500 for use with 3-point, 5-point or 6-point harnesses. Although FIG. 5 shows a toddler seat cover, one skilled in the art will readily understand how to adapt the invention to an infant seat. Periphery 260 of removable cover 500 comprises an elastic material that secures the removable seat cover to the seat. Periphery 260 may comprise, for example, a rubber material sown into the edge of the seat cover or making a border area of a stretchy material such as Lycra (™). "U"-shaped opening 510 allows shoulder straps 110-1 and 110-2 (not shown) to pass through. Top portions 520-1 and 520-2 of "U"-shaped opening 510 are wide enough to accommodate shoulder straps 110-1 and 110-2, and begin above the highest upper anchor point 114-1 and 114-2 (not shown) on the shoulder straps. The lower narrow portion of "U"-shaped opening 510 extend low enough to accommodate lower anchor points 116-1 and 116-2 (not shown) on a 5-point or 6-point harness. Fasteners 540, such as Velcro or snaps, close the narrow portion of "U"-shaped opening 510, leaving two gaps at 530-1 and 530-2 allowing shoulder straps 110-1 and 110-2 on a 5-point or 6-point harness to pass though. Crotch opening 280 is located over crotch anchor point 118 (not shown). Crotch opening 280 may be rectangular or oblong to accommodate various placements of crotch anchor point 118 by different manufactures. Top portions 520-1 and 520-2 of "U"-shaped opening 510 may be elasticized to enhance protection to the underlying factory cover.

Figure 6:
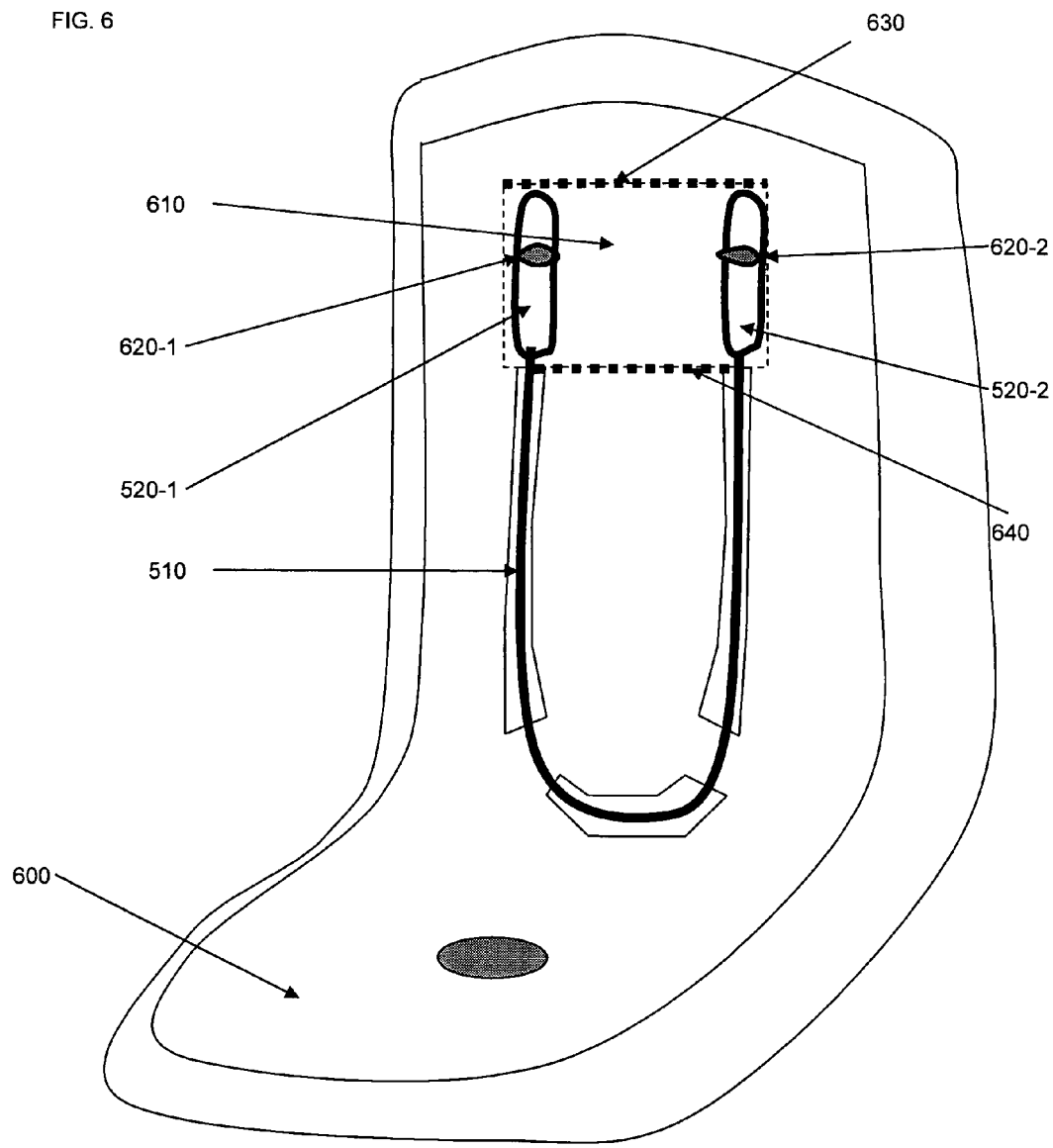
FIG. 6 is a front view of a removable car seat cover with a "U"-shaped opening for the shoulder straps and an additional panel attached to the back of the cover.
Figure 7:
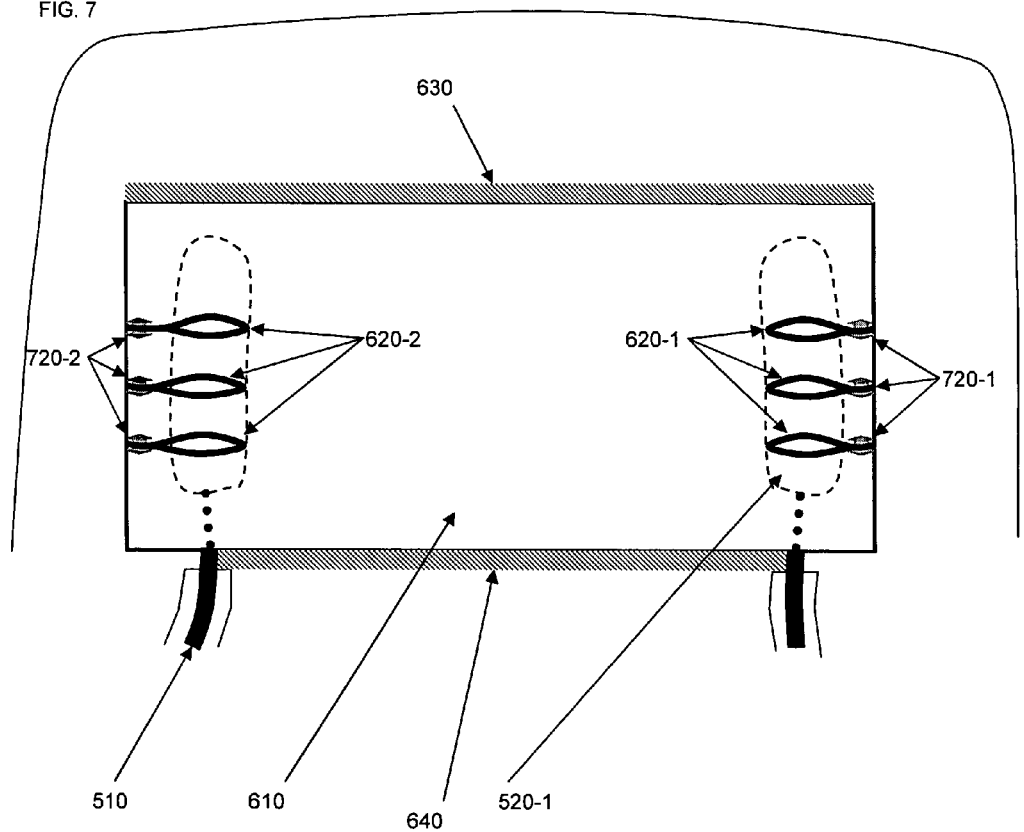
FIG. 7 is a back view of the panel attached to a removable car seat cover with a "U"-shaped opening.

Removable seat cover 600 is an alternate embodiment of removable seat cover 500 as shown in FIG. 6. Panel 610 is sewn behind the wide portions 520-1 and 520-2 at the top of "U"-shaped opening 510. Panel 610 extends wider than the width between the outer edges of openings 520-1 and 520-2. The top of panel 610 fixedly attaches 630 to cover 500 above the top of openings 520-1 and 520-2. The bottom of panel 610 fixedly attaches 640 to cover 500 below wide portions 520-1 and 520-2 between the slits defined by "U"-shaped opening 510. Slots 620-1 and 620-2 cut into the sides of panel 610 allow shoulder straps 110-1 and 110-2 (not shown) to pass though. FIG. 7 shows panel 610 in more detail from behind cover 600. Fasteners 720-1 and 720-2, such as snaps, close shoulder strap slots 620-1 and 620-2. Shoulder strap slots 620-1 and 620-2 position straps 110-1 and 110-2 (not shown) at a comfortable location for the child. Shoulder strap slots 620-1 and 620-2 may be elasticized to enhance protection to the underlying factory cover. Panel 610 is fixedly attached, by sewing for example, to cover 600 at 630 and 640. A long panel, twice the height of the wide shoulder strap portion of the "U"-shaped opening, can be adapted to accommodate a wide range of shoulder strap heights without the need for multiple horizontal shoulder strap slots. The extra material can be folded and tucked away behind the seat cover.

Figure 8:
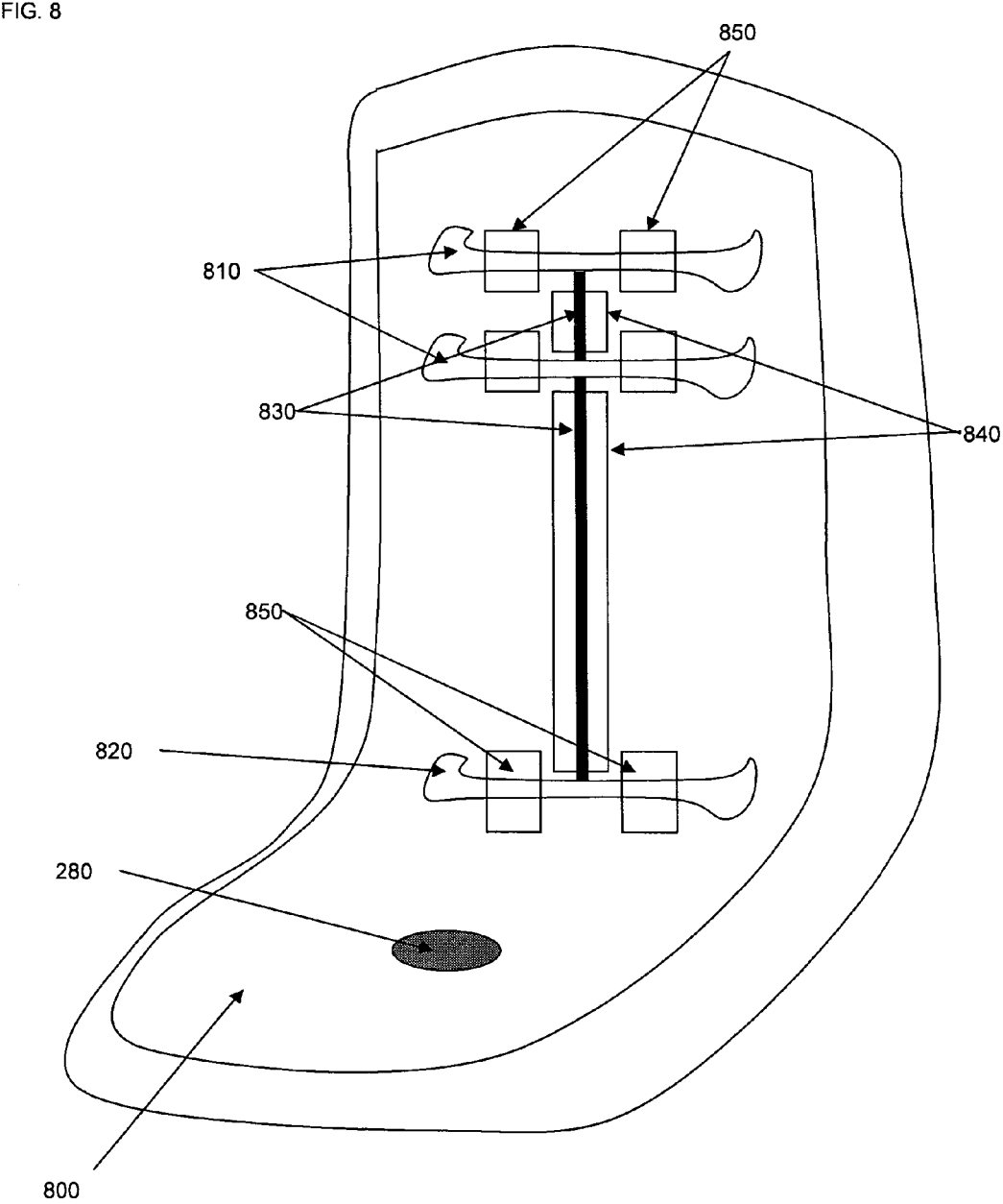
FIG. 8 is a front view of a removable car seat cover with horizontal openings for the shoulder straps.

FIG. 8 shows removable car seat cover 800 for use with 3-point, 5-point or 6-point harnesses. Although FIG. 8 shows a toddler seat cover, one skilled in the art will readily understand how to adapt the invention to an infant seat. Periphery 260 of removable cover 800 comprises an elastic material that secures the removable seat cover to the seat. Periphery 260 may comprise, for example, a rubber material sewn into the edge of the seat cover or making a border area of a stretchy material such as Lycra (™). A plurality of horizontal openings 810 across the upper back of cover 800 accommodate shoulder straps 110-1 and 110-2 (not shown) attached at upper anchor points 114-1 and 114-2 (not shown). Horizontal opening 820 at the child's hips accommodates shoulder straps 110-1 and 110-2 attached at lower anchor points 116-1 and 116-2 (not shown) on a 5-point or 6-point harness. Vertical slit 830 connects openings 810 and 820 to allow shoulder straps 110-1 and 110-2 of 5-point and 6-point harnesses to extend through cover 800 without being disconnected from anchor points 114-1, 114-2, 116-1 and 116-2. Fasteners 840, such as Velcro, connect the two sides of vertical slit 830 to keep the back of seat cover 800 flat and to prevent soiling of the factory cover. Fasteners 850 may also secure the center portion of horizontal openings 810 and 820 between shoulder straps 110-1 and 110-2. Crotch opening 280 is located over crotch anchor point 118 (not shown). Crotch opening 280 may be rectangular or oblong to accommodate various placements of crotch anchor point 118 by different manufactures. Openings 810 and 820 may be elasticized to enhance protection to the underlying factory cover.

Figure 9:
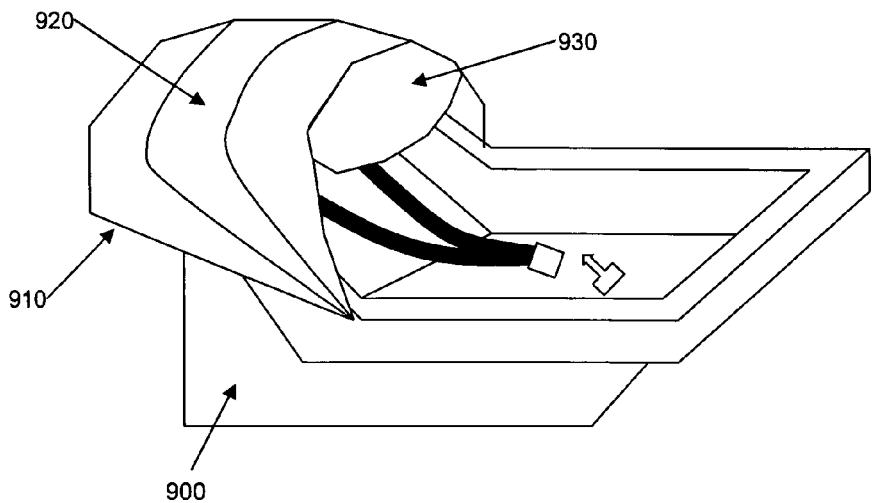
FIG. 9 is an infant car seat canopy cover with a front panel.

FIG. 9 shows removable car seat canopy cover 930 for use with an infant car seat 900. Canopy cover 920 fits over the existing canopy 910 on car seat 900, and attaches by clips, pins or other fasteners. At least one additional panel 930 extends past the front and/or back of the canopy to provide extra protection from the sun. The at least one additional panel 930 may have a lining made from a material that holds the panel stiff, so that panel 930 extends outwards rather than hanging down. Canopy cover 930 is made from a material to match the car seat covers previously disclosed.

Figure 10:
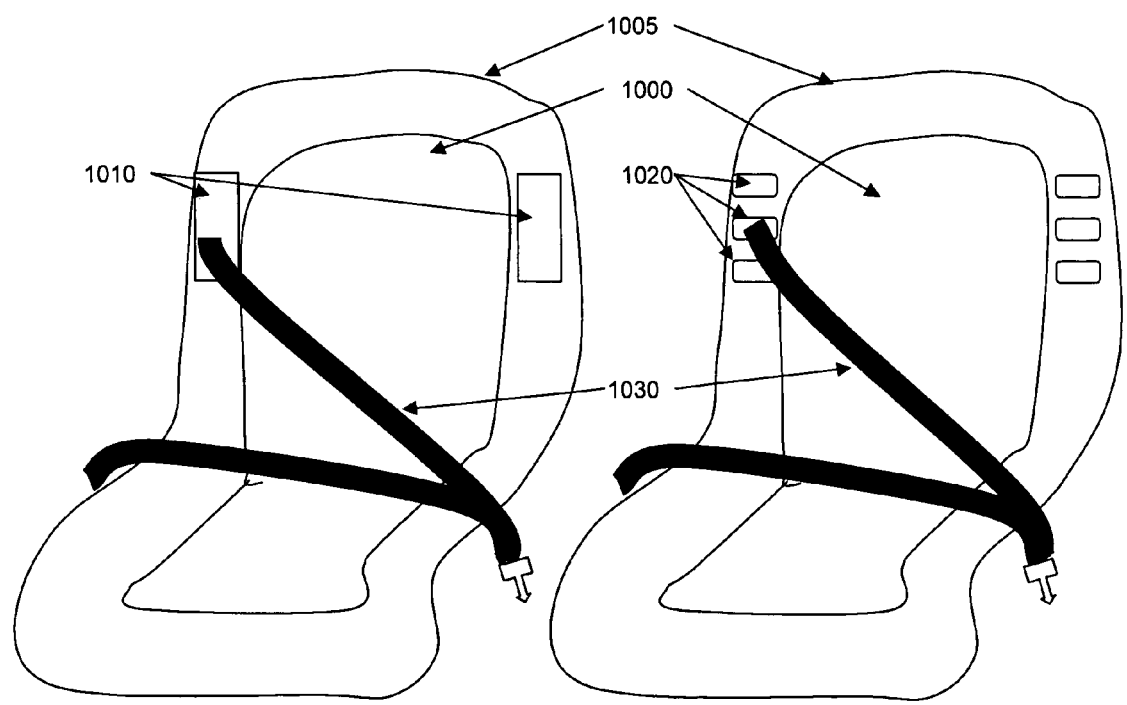
FIG. 10 is a booster seat cover with openings for a shoulder belt.

FIG. 10 shows removable car seat cover 1000 for use with a booster seat. Booster seats use the shoulder and lap belt of an automobile to restrain children. A shoulder belt positioning mechanism, such as a clip or opening in the seat back, positions the shoulder belt properly over a child's torso. Periphery 1005 of removable cover 1000 comprises an elastic material that secures the removable seat cover to the seat. Periphery 1005 may comprise, for example, a rubber material sewn into the edge of the seat cover or making a border area of a stretchy material such as Lycra (™). Openings 1010 on the upper bolster area of removable seat cover 1000 allow shoulder belt 1030 to pass though the cover. Openings 1010 correspond with the shoulder belt positioning mechanism on the booster seat. In an alternate embodiment of the booster seat cover, a plurality of openings 1020 corresponds with shoulder belt positioning mechanisms on the booster seat. Elastic around openings 1010 and 1020 may be used to enhance protection to the underlying factory cover.

A preferred form of the invention has been shown in the drawings and described above, but variations in the preferred form will be apparent to those skilled in the art. Specifically, seat covers can be made in different sizes and shapes to accommodate a variety of car seat styles and manufactures. The preceding description is for illustrative purposes only, and the invention should not be construed as limited to the specific form shown and described. The scope of the invention should be limited only by the language of the following claims.

What is claimed is:

1. A car seat cover adapted for use with a car seat having a frame, a padding disposed over the frame, a first shoulder strap and a second shoulder strap, each shoulder strap having a connector, an upper anchor point, each anchor point being attached to the frame, and at least one crotch strap, the crotch strap comprising an anchor point attached to the frame and a buckle, the buckle being configured to accept the connectors, the car seat cover comprising:

a fabric cover having an outer periphery that is adapted to be coupled to the car seat frame over the padding, the fabric cover defining a "U"-shaped shoulder strap opening and a crotch strap opening, the "U"-shaped shoulder strap opening and the crotch strap opening adapted to allow the shoulder straps of the car seat and the crotch strap of the car seat to extend through the fabric cover; and a border portion disposed about the outer periphery, wherein the border portion is adapted to secure the cover about the car seat while allowing the shoulder straps of the car seat to extend through the "U"-shaped shoulder strap opening of the cover, the crotch strap of the car seat to extend though the crotch strap opening of the cover, and the connectors of the car seat to be inserted into the buckle of the car seat, without detaching any of the anchor points of the car seat from the frame of the car seat;

a panel attached to back side of the cover, disposed as to cover the top portions of the "U"-shaped opening where the shoulder straps of the car seat connect to the upper anchor points of the car seat;

wherein the panel is twice the height of the top portions of the "U"-shaped opening where the shoulder straps of the car seat connect to the upper anchor points of the car seat, the panel comprising one horizontal slit on each side through which the shoulder straps of the car seat can extend;

whereby the car seat cover is adapted for disposition between a child and the car seat when the shoulder straps of the car seat and the crotch strap of the car seat are used to secure the child in the car seat.

2. The car seat cover of claim 1, wherein each shoulder strap further comprises a lower anchor point, each anchor point being attached to the frame.

3. The car seat cover of claim 1, wherein the "U"-shaped shoulder strap opening is adapted to receive the shoulder straps of the car seat where the shoulder straps of the car seat connect to the upper anchor points of the car seat.

4. The car seat cover of claim 1, wherein a plurality of sides of the "U"-shaped opening are held together by a fastener attached to the car seat cover.

5. The car seat cover of claim 1, wherein the sides of the "U"-shaped openings include an elastic material.

6. The car seat cover of claim 1, wherein the panel is fixedly attached above and below the top portions of the "U"-shaped opening where the shoulder straps connect to the upper anchor points.

7. The car seat cover of claim 1, wherein the panel comprises a plurality of horizontal slits through which the shoulder straps can extend.

8. The car seat cover of claim 6, wherein a plurality of outer ends of a plurality of horizontal slits are closed with a plurality of second fasteners.

9. The car seat cover of claim 1, wherein the cover fabric comprises a waterproof lining.

10. The car seat cover of claim 1, wherein the car seat cover further comprises a canopy portion, the car seat cover comprising:
a fabric cover adapted to be coupled to a canopy section of the car seat; and
an additional panel extending past an edge of the canopy.

* * * * *